Jan. 14, 1930.  L. V. STANDISH  1,743,497
NONSKID CHAIN FOR AUTOMOBILES
Filed May 9, 1928
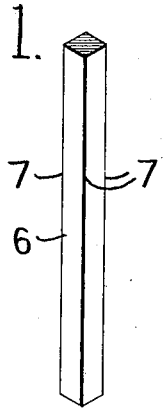
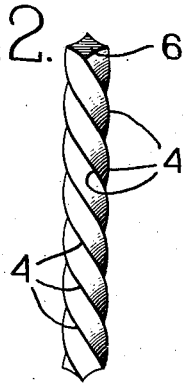
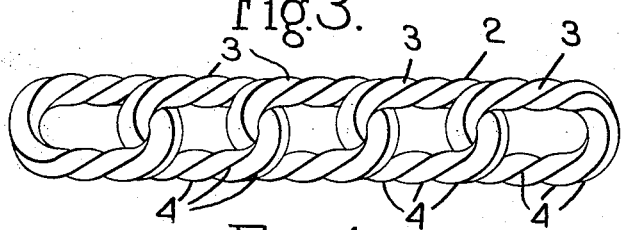
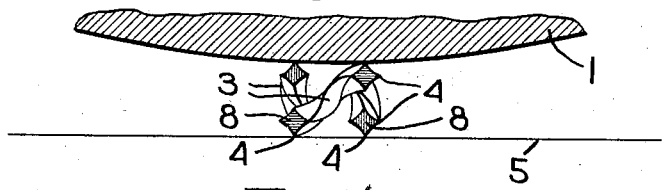
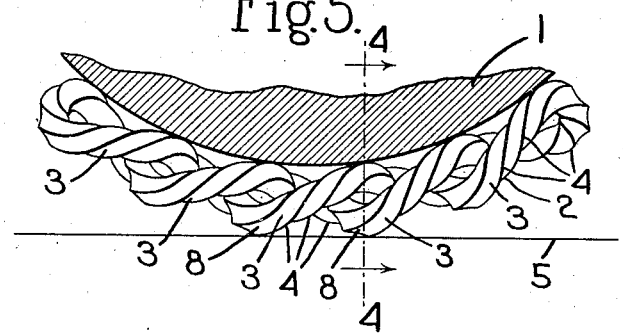
Inventor
Leo V. Standish
by Heard Smith & Tennant.
Attys.

Patented Jan. 14, 1930

1,743,497

UNITED STATES PATENT OFFICE

LEO V. STANDISH, OF GARDINER, MAINE

NONSKID CHAIN FOR AUTOMOBILES

Application filed May 9, 1928. Serial No. 276,436.

This invention relates to non-skid chains for use with automobiles and it has for its general object to provide a non-skid chain which will be effective in preventing lateral skidding as well as spinning of the wheels.

In the ordinary tire chain the links of the cross chains are made from hardened steel wire which is round in cross section. While a tire chain having this construction will tend to prevent the spinning of a wheel yet it has relatively little value in preventing lateral or sidewise skidding.

In carrying out my invention I form the links of the cross chain in such a way that they will be effective in preventing the lateral sliding or slipping of the wheel as well as the spinning of the wheel.

This is accomplished by so forming each link of the cross chain that it will have one or more sharp-edged ribs extending spirally around the sides thereof, said ribs providing gripping edges on the sides of the link which engage the road surface.

In order to give an understanding of the invention I have illustrated in the drawings a selected embodiment thereof which will now be described after which the novel features will be pointed out in the appended claim.

Fig. 1 is a perspective view showing a rod from which my improved link may be made;

Fig. 2 illustrates said rod after it has been twisted to form ribs extending spirally thereof;

Fig. 3 is a plan view of a portion of a cross chain embodying my invention;

Fig. 4 is a section on the line 4—4, Fig. 5;

Fig. 5 is a fragmentary view illustrating the action of the cross chain.

Inasmuch as my present invention relates to the links forming the cross chains of a tire chain I have not thought it necessary to illustrate a complete chain herein but have only shown a portion of a cross chain. The entire tire chain will, of course, include the two side chains extending around the tire and a plurality of cross chains connecting the side chains and which extend transversely of the thread of the tire.

In the drawings I have shown at 1 a portion of an automobile tire and at 2 I have indicated generally a portion of a cross chain, the side chains of the tire chain and the connections between the cross chain and side chains being omitted from the drawings as they form no part of the present invention.

The links of the cross chain embodying my invention are indicated at 3. These links are preferably twisted links as usual in cross chains and as shown best in Fig. 5, formed from hardened steel rod of angular cross section. Each link is therefore provided with a plurality of sharp-edged ribs 4 which extend spirally about the sides of the link. The portions of these sharp edges 4 that are located on the part of the link that engages the road surface 5 constitute gripping edges which furnish an effective gripping contact with the road surface that will prevent slipping of the wheel either in the line of travel or laterally thereto.

One convenient way of making a link having this construction is to take a bar 6 of the proper length which is square in cross section as shown in Fig. 1 and then to twist the bar as shown in Fig. 2. When the bar is twisted the corners 7 of the bar will form sharp-edged ribs 4 which extend spirally of the bar.

After the bar has been twisted as shown in Fig. 2 it may be made into a link 3 and assembled with other links in any suitable way with the ends welded together, in the usual manner, to form a continuous oblong link and when assembled with others to make up a chain section such as shown in Figs. 3 and 5. Each of the links 3 will then have sharp-edged ribs 4 extending spirally about the sides thereof and when the chain is applied to the tire as shown in Figs. 4 and 5 the portions 8 of the links which engage the road surface 5 will present sharp gripping edges that will cut into ice and will prevent the wheel from slipping either sideways or in the direction of travel.

A chain embodying my invention is relatively inexpensive to manufacture and is effective in preventing the skidding of the wheel.

I claim:

A cross chain for a non-skid tire chain comprising a series of relatively movable inter engaging closed chain links, each being formed from wire stock having sharp-edged ribs extending spirally from one end to the other thereof, thereby to provide the portions of the links which engage the road surface with gripping edges.

In testimony whereof, I have signed my name to this specification.

LEO V. STANDISH.